United States Patent [19]

Takeda

[11] Patent Number: 4,783,586

[45] Date of Patent: Nov. 8, 1988

[54] HEATING ELEMENT MADE OF CARBON

[75] Inventor: Junichi Takeda, Hirakatashi, Japan

[73] Assignees: Uniheat Co. Ltd., Osaka; Nakabishi Kensetsu Co. Ltd., Sapporo, both of Japan

[21] Appl. No.: 96,238

[22] Filed: Sep. 8, 1987

Related U.S. Application Data

[63] Continuation of Ser. No. 836,407, Mar. 5, 1986, abandoned.

[30] Foreign Application Priority Data

Mar. 6, 1985 [JP] Japan .............................. 60-044250

[51] Int. Cl.⁴ ...................... H05B 3/10; H01C 1/012; H01C 1/02; B32B 9/00

[52] U.S. Cl. .................................. 219/544; 219/533; 219/548; 219/549; 174/113 C; 338/214; 338/308; 252/510; 252/511; 252/512; 428/364; 428/367; 428/373; 428/402; 428/405

[58] Field of Search .............. 219/533, 544, 548, 549; 338/214, 308; 252/510, 511, 512; 174/113 C; 428/364, 367, 373, 402, 405

[56] References Cited

U.S. PATENT DOCUMENTS

| | | | |
|---|---|---|---|
| 2,730,597 | 1/1956 | Podolsky et al. | 338/308 |
| 4,200,973 | 5/1980 | Farkas | 29/611 X |
| 4,614,678 | 9/1986 | Ganga | 428/74 X |

FOREIGN PATENT DOCUMENTS

| | | | |
|---|---|---|---|
| 455875 | 4/1949 | Canada | 174/113 C |

*Primary Examiner*—Clifford C. Shaw
*Assistant Examiner*—Gerald E. Preston
*Attorney, Agent, or Firm*—Gifford, Groh, VanOphem, Sheridan, Sprinkle and Dolgorukov

[57] ABSTRACT

A heating element made of carbon, comprising a heating member including carbon powder and an insulating resin, the powder being kneaded with the resin, and a core member formed of an insulating material and having a higher fusing point than the heating member, the core member being disposed substantially centrally of the heating member.

5 Claims, 2 Drawing Sheets

HEATING ELEMENT MADE OF CARBON

This is a continuation of co-pending application Ser. No. 836,407, filed on March 5, 1986, now abandoned.

BACKGROUND OF THE INVENTION

The present invention relates to a heating element made of carbon, which is installed under road surfaces to be used for melting snow or under floors for heating purposes, the heating element comprising a heating member formed of carbon powder and an insulating resin kneaded together.

The heating element of this type consumes less electricity than the known Nichrome wire, and the heating member per se has a temperature control function with the insulating resin repeating expansion and contraction with temperature variations thereby controlling an electric current flow. Therefore, in recent years this heating element is employed in floor heating and various other applications, and is marketed in planar and linear forms. However, the heating element commercially available heretofore has the disadvantage that the heating temperature greatly varies at locations of the heating element, failing to assure uniform heating.

The present inventor has conducted various tests in search of the cause of such a drawback, and has found the cause in the construction of the heating element. The conventional heating element, taking one in linear form as shown in FIG. 5 of the accompanying drawings for example, comprises a solid heating member 2' having an about 4 mm diameter and peripherally coated with an insulating member 4' having an about 1 mm thickness. Such heating element 1' usually is formed by extruding the heating member 2' and insulating member 4' together from an extruding machine and immediately cooling the same by cooling water or other means. It is therefore inevitable that the cooling progresses by degrees from surface to inside, which causes the composition of the heating member 2' to be nonuniform in the radial direction and even creates numerous voids A in the center. It has been found that, because of the nonuniformity in the composition of the heating member 2' and the presence of voids A, the electric resistance of the heating member 2' greatly varies from one location thereof to another, which results in non-uniformity in its heating temperature. Even if a thermister, for example, is incorporated from the safety point of view to control the temperature, the uneven heating temperature results in certain locations becoming very hot. This renders the use of the thermister meaningless and gives rise to a safety problem. Such a phenomenon occurs with the planar heating element also. Furthermore, in the case of linear heating element 1', expansion of the insulating member occurring with the heating greatly elongates the heating element 1'. Where a plurality of heating elements 1' are jaxtaposed, adjacent heating elements when elongated tend to contact each other causing a short circuit.

SUMMARY OF THE INVENTION

The present invention intends to eliminate all the disadvantages of the prior art by utilizing the above-noted new findings. The object of the invention is to provide a useful heating element made of carbon which is capable of securing a substantially uniform heating temperature throughout the heating element and which, when in linear form, undergoes a minimal amount of elongation.

In order to achieve this object, a heating element made of carbon according to this invention is characterized in that a heating member formed of carbon powder and an insulating resin kneaded together surrounds a core member formed of an insulating engineering plastic material and having a higher fusing point than the heating member.

Since the insulating core member is placed in the heating member, the manufacturing mode where the heating member and the core member are extruded together from an extruding machine and are cooled immediately thereafter causes the non-uniformity of composition and voids only in the core member inside the heating member. The heating member disposed exteriorly remains quite uniform in composition and its electric resistance is substantially constant over various locations thereof. Furthermore, since this core member has a higher fusing point than the heating member, the core member itself becomes little elongated in spite of a temperature rise and acts to check elongation of the heating member which would otherwise be elongated by the temperature rise.

As will be clear from the foregoing explanation, the heating element according to this invention has a substantially constant electric resistance over various locations thereof has a substantially uniform heating power throughout, which facilitates its temperature control. Where the heating element is in linear form and a plurality of heating elements are arranged parallel to one another, their elongation is restrained to a maximum degree thereby to prevent contact between adjacent heating elements.

BRIEF DESCRIPTION OF THE DRAWINGS

FIGS. 1 to 3 show a heating element made of carbon according to the present invention, in which FIG. 1 is a sectional view, FIG. 2 is a partly broken away plan view showing the heating elements as used in a panel heater, and FIG. 3 is a sectional view taken on line III—III of FIG. 2;

DETAILED DESCRIPTION OF THE PREFERRED EMBODIMENTS

Figure 1:
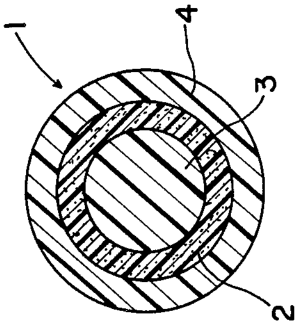

An embodiment of the invention will be described with reference to the drawings. FIG. 1 shows a section of a linear heating element 1 comprising a conventional heating member 2 formed of carbon powder and an insulating resin kneaded together and a core member 3 embedded centrally of the heating member 2. The core member 3 has a higher fusing point than the heating member 2 and is formed of an insulating engineering plastic material and more specifically of polypropylene or polyethylene. The heating member 2 is peripherally coated with an insulating member 4 comprising polypropylene, polyethylene or the like, as necessary. The heating element 1 having the above construction may be manufactured relatively easily by extruding the core member 3, heating member 2 and insulating member 4 all together from an ordinary extruding machine. In this case it is of advantage from the manufacturing point of view if, as shown in FIG. 1, the heating member 2 and insulating member 4 have a substantially annular section and the core member 3 has a substantially circular section. However, it is not absolutely necessary for these members to have such sectional shapes. The shapes may be modified in various ways; for example, the core member 3 may have an elliptical or polygonal section and the heating member 2 may have an elliptical or polygonal hollow section.

Figure 2:
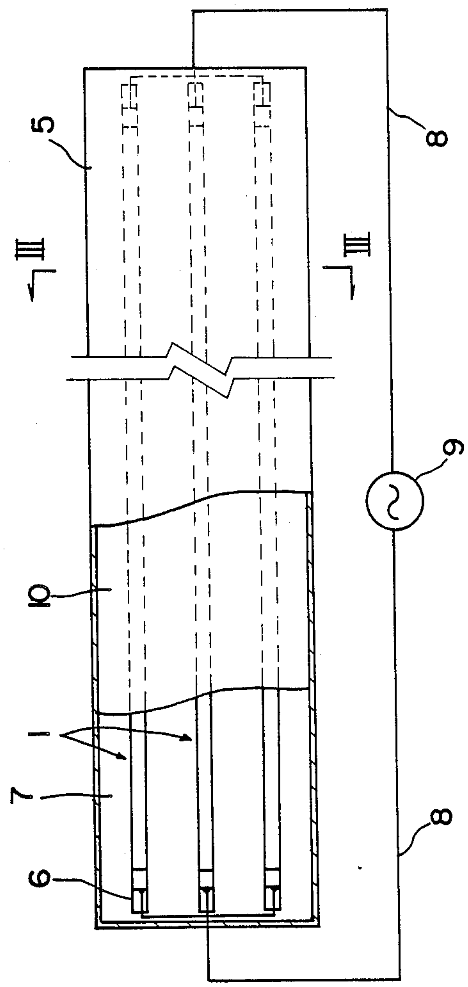
Figure 3:
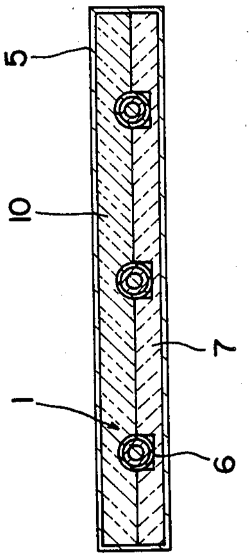

FIGS. 2 and 3 show an example in which the above heating element 1 is employed in a panel heater. The panel heater comprises a box 5 formed of a metallic material and enclosing a ceramic bed 7 defining a total of three grooves 6, and the heating element 1 is fitted in each groove 6. The heating elements 1 are connected, in parallel with one another, to an AC source 9 through wires 8. Glass wool 10 is filled in a space inside the box 5. The heating elements 1 become hot when electrified as does the conventional heating element. However, since each of the heating elements 1 according to this invention becomes hot substantially uniformly in a longitudinal direction thereof, a top surface of the box 5 naturally is heated substantially uniformly. Furthermore, the presence of core member 3 is effective to check elongation of the heating element 1, and there occurs no contact between the adjacent heating elements 1 which would cause a short circuit.

Figure 5:
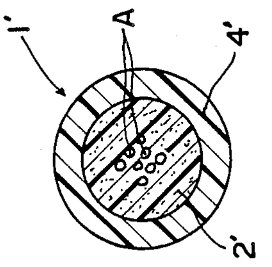
Fig.5 PRIOR ART
FIG. 5 is a sectional view of a conventional heating element.

In order to confirm the advantages of this invention comparative tests have been carried out on the conventional heating element shown in FIG. 5 and the heating element embodying this invention shown in FIG. 1, and the test results will be set forth hereinafter. The conventional heating element used in the tests comprised a heating member 2′ having a 4 mm diameter and an insulating member 4′ having a 1 mm thickness while the heating element of this invention used in the tests comprised the core member 3 having a 4 mm diameter and the heating member 2 having a 1 mm thickness. The latter included no heating element 4 since the heating element 4 was not absolutely necessary. Naturally, both heating elements had the heating members 2′ and 2 identical to each other as far as the material per se is concerned.

(Test 1)

Both heating elements 1′ and 1 were manufactured using an ordinary extruding machine, and each was cut to pieces of a 1,600 mm length. Fifty pieces each were taken as samples for comparison in electric resistance measurements. Both were manufactured with 1,500 ohms as the per piece standard.

With the conventional heating element, 26 pieces had resistance values 1,000–1,2000 ohms, 5 pieces 1,300–1,400 ohms, 11 pieces 1,400–1,500 ohms, 4 pieces, 1,700–1,900 ohms and 4 pieces 2,000–2,300 ohms.

With the heating element of this invention, on the other hand, 12 pieces had resistance values 1,480–1,500 ohms and 38 pieces 1,500–1,520 ohms.

It may be understood from these results that the heating element of this invention is very stable in electric resistance, which means that the electric resistance is substantially uniform throughout locations in the longitudinal direction of the heating element.

(Test 2)

Figure 4:
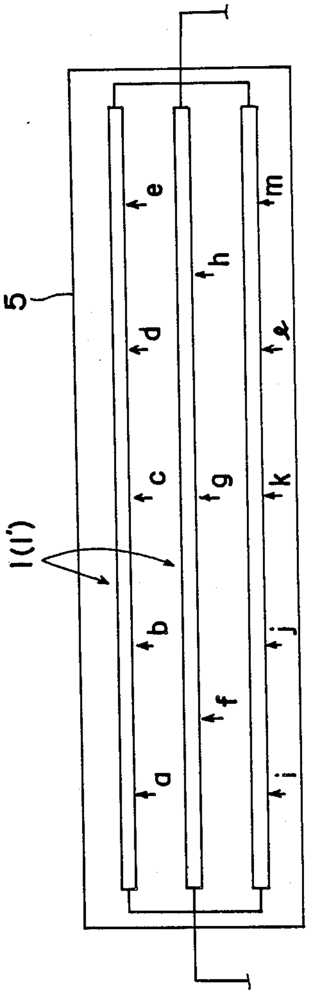
FIG. 4 is a schematic plan view of the panel heater showing locations of temperature measurement.

Three 1,600 mm long pieces of each of the heating elements 1′ and 1 were placed in the box 5 as shown in FIGS. 2 and 3, a 200 volt alternating current was sent thereto, and one hour later the surface temperatures of the two heating elements 1′ and 1 were measured and compared by means of thermolabels. The temperatures were measured at points a to m in FIG. 4. The box 5 had 1,750 mm long sides, 120 mm short sides and a 15 mm height. The temperatures in the table are in the centigrade.

| points | conventional | invention |
|---|---|---|
| a | 85 | 80 |
| b | 75 | 80 |
| c | 78 | 81 |
| d | 80 | 80 |
| e | 70 | 80 |
| f | 80 | 80 |
| g | 72 | 81 |
| h | 83 | 80 |
| i | 75 | 80 |
| j | 85 | 80 |
| k | 80 | 81 |
| l | 76 | 80 |
| m | 80 | 80 |

It will be understood from these results how stable the heating temperatures are at the various locations longitudinally of the heating element embodying this invention. It has further been confirmed through this test that there is an outstanding difference in the amount of elongation between the two heating elements 1′ and 1.

The difference in the amount of elongation became clear one hour from the start of electrification. After the lapse of 24 hours from the start of electrification the conventional heating element began to deform due to the elongation at about 95° C. and became overheated to about 120° C. at deformed locations. However, the heating element of this invention did not show any deformation due to the elongation when the element was heated to about 100° C.

The invention has been described taking the linear heating element 1 for example, but the gist is applicable also to a planar heating element. In embodying the invention in the planar heating element, a core member may completely be embedded in a planar heating member or may be sandwiched between two adjacent planar heating members.

I claim:

1. A heating element of carbon, comprising a heating member formed of carbon powder and an insulating resin kneaded together, wherein a core member formed of an insulating engineering plastic having a fusing point higher than that of said heating member is extruded under a fused or half-fused condition thereof integrally with said heating member and is inserted into a center portion of said heating member.

2. A heating element, as claimed in claim 1, wherein said heating member and said core member are both in linear form, and said linear core member is embedded substantially centrally of said linear heating member.

3. A heating element, as claimed in claim 1, wherein the insulating engineering plastic comprises one of polyethylene and polypropylene.

4. A heating element, as claimed in claim 3, wherein said heating member has a substantially annular section and said core member has a substantially circular section.

5. A panel type heater, comprising a plurality of the carbon heating members of claim 1 disposed substantially in the same plane, each of said plurality of heating members being connected in parallel with a power supply.

* * * * *